(12) United States Patent
Mariani

(10) Patent No.: US 9,666,310 B1
(45) Date of Patent: May 30, 2017

(54) ACCIDENT-TOLERANT OXIDE FUEL AND CLADDING

(71) Applicant: Robert D. Mariani, Idaho Falls, ID (US)

(72) Inventor: Robert D. Mariani, Idaho Falls, ID (US)

(73) Assignee: U.S. Department of Energy, Washington, DC (US)

( * ) Notice: Subject to any disclaimer, the term of this patent is extended or adjusted under 35 U.S.C. 154(b) by 542 days.

(21) Appl. No.: 13/847,009

(22) Filed: Mar. 19, 2013

(51) Int. Cl.
*G21C 3/18* (2006.01)

(52) U.S. Cl.
CPC .................................... *G21C 3/18* (2013.01)

(58) Field of Classification Search
USPC ......................................................... 376/420
See application file for complete search history.

(56) References Cited

U.S. PATENT DOCUMENTS

| | | | |
|---|---|---|---|
| 4,879,093 | A | 11/1989 | Garde |
| 5,932,930 | A | 8/1999 | Wadekamper et al. |
| 6,697,450 | B2 | 2/2004 | Vaidyanathan et al. |
| 7,666,470 | B1 | 2/2010 | McCoy |
| 8,293,151 | B2 | 10/2012 | Lahoda et al. |
| 2010/0054389 | A1 | 3/2010 | Fetterman |
| 2011/0222643 | A1 | 9/2011 | Doudoux et al. |
| 2011/0240911 | A1* | 10/2011 | Sundberg et al. ............. 252/71 |

OTHER PUBLICATIONS

MacDonald, R. D. Irradiation performance of zircaloy sheathed fuel elements with metallic or ceramic discs between UO_2 pellets. Atomic Energy of Canada Ltd., Chalk River, Ontario. Chalk River Nuclear Labs, 1970. Text version available online: <https://inis.iaea.org/search/search.aspx?orig_q=RN:1003865>.*

Jo, Chang Keun, Nam Zin Cho, and Yong Hee Kim. "Graphite-filled mixed-oxide fuel design for fully loaded PWR cores." Annals of Nuclear Energy 27.9 (2000): 819-829. Available online: <http://www.sciencedirect.com/science/article/pii/S0306454900000049#>.*

(Continued)

*Primary Examiner* — Jack W Keith
*Assistant Examiner* — Lily C Garner
(74) *Attorney, Agent, or Firm* — Karen L. Blouin; Michael J. Dobbs; Brian J. Lally

(57) ABSTRACT

Systems and methods for accident tolerant oxide fuel. One or more disks can be placed between fuel pellets comprising $UO_2$, wherein such disks possess a higher thermal conductivity material than that of the $UO_2$ to provide enhanced heat rejection thereof. Additionally, a cladding coating comprising zircaloy coated with a material that provides stability and high melting capability can be provided. The pellets can be configured as annular pellets having an annulus filled with the higher thermal conductivity material. The material coating the zircaloy can be, for example, $Zr_5Si_4$ or another silicide such as, for example, a Zr-Silicide that limits corrosion. The aforementioned higher thermal conductivity material can be, for example, Si, $Zr_xSi_y$, Zr, or $Al_2O_3$.

6 Claims, 5 Drawing Sheets

(56) References Cited

OTHER PUBLICATIONS

Yang, Yong-Sik, et al. "Thermomechanical analysis and irradiation test of sintered dual-cooled annular fuel." Nuclear Technology 178.3 (2012): 267-279. Available online: <http://www.ans.org/pubs/journals/nt/a_13593>.*
Caillet, M., et al. "Preparation and oxidation of zirconium silicide coatings on zirconium." Materials and coatings to resist high temperature corrosion. 1978. Abstract: <https://inis.iaea.org/search/search.aspx?orig_q=RN:10440627>.*
Chao, T. L., et al. Potential of duplex fuel in prebreeder, breeder, and power reactor designs: tests and analyses (AWBA Development Program). No. WAPD-TM-1512. Bettis Atomic Power Lab., Pittsburgh, PA (USA), 1982. Available online: <http://www.osti.gov/scitech/servlets/purl/6762496>.*
Kutty, TR Govindan, Joydipta Banerjee, and Arun Kumar. "Thermophysical Properties of Thoria-based Fuels." Thoria-based Nuclear Fuels. Springer London, 2013. 11-70. full version available online: <http://link.springer.com/chapter/10.1007/978-1-4471-5589-8_2>.*

\* cited by examiner

ACCIDENT-TOLERANT OXIDE FUEL AND CLADDING

STATEMENT OF GOVERNMENT RIGHTS

The United States Government has rights in this invention pursuant to Contract No. AC07-05-ID114517 with the U.S. Department of Energy.

FIELD OF THE INVENTION

Embodiments are generally related to reactor fuel assemblies and cladding configurations thereof. Embodiments are also related to accident-tolerant oxide fuels capable of being utilized with nuclear reactors and related components.

BACKGROUND

In relation to the events surrounding the tsunami at Fukushima and the ensuing loss of coolant accident, interest in developing more accident-tolerant fuels has greatly increased. Despite the success of oxide fuels, their thermal conductivity is a major drawback in normal operation, transients, accident scenarios, and storage. An innovative fuel design is herein described that lowers the peak temperature of the fuel by approximately 640 degrees Celsius at peak power. Initial modeling results are summarized and compared to the case of conventional $UO_2$ pellet fuel. Performance requirements have been identified for candidate materials to be incorporated into the design; a significant manufacturing infrastructure exists for some of these candidates.

Prior efforts to improve the thermal conductivity of $UO_2$ fuels include investigation of dispersion fuels such as cercers and cermets. Economic hindrances to such fuel forms include the loss of reactivity due to the reduced U-235 density and increased manufacturing costs. Dispersion fuels characteristically include a large amount of inert material and volume, so that the U-235 enrichment would have to be substantially increased above 5% to account for the displaced volume of $UO_2$.

Annular fuels provide an alternative way to reduce peak fuel temperature. The peak temperature of the fuel is lowered due to the reduction in the conduction path length. This design has been applied to fast reactor oxide fuels that operate at high linear powers to guard against fuel melting. In the case of light water reactor fuels, the U-235 enrichment would again have to be increased, but not to the extent needed with dispersion fuels.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide for an improved reactor fuel assemblies and cladding configurations thereof.

It is another aspect of the disclosed embodiments to provide for accident-tolerant oxide fuels capable of being utilized with nuclear reactors and related components.

The aforementioned aspects and other objectives and advantages can now be achieved as described herein. Systems and methods for accident tolerant oxide fuel are disclosed. In general, one or more disks can be placed between fuel pellets comprising $UO_2$, wherein such disks possess a higher thermal conductivity material than that of the $UO_2$ to provide enhanced heat rejection thereof. The pellets can be configured as annular pellets having an annulus filled with rod-like or tube-like inserts with a higher conductivity material. Additionally, a cladding coating comprising zircaloy coated with a material that provides stability and high melting capability can be provided. The material coating the zircaloy can be, for example, $Zr_5Si_4$ or another silicide such as, for example, a Zr-Silicide that limits corrosion. The aforementioned higher thermal conductivity material can be, for example, Si, Zr, $Al_2O_3$, Nb, or Mo.

In general, two novel modifications to existing LWR fuel and cladding can be implemented to improve safety while maintaining or improving fuel performance compared to existing LWR fuels. For the fuel, disks may be placed between fuel pellets, with the disks having much higher thermal conductivity than the $UO_2$, allowing for better heat rejection. In addition, annular pellets may be used instead of solid fuel, with the annulus filled with a higher thermal conductivity material identical in nature, or different from the disc material. For fuel performance comparable to existing $UO_2$ at 5% enrichment, the $^{235}U$ enrichment would have to be increased on the order of 7-10%. Cladding modification involves coating the zircaloy with a material such as $Zr_5Si_4$, $ZrSi_2$, $ZrSi$, or other silicides in the Zr—Si system because they are stable and high melting. In the event of oxidation, a slag-like amorphous layer is expected to form with mobile, self-healing properties, especially at the elevated temperatures of accident scenarios. If steam (or water) reaction with zircaloy can be mitigated or eliminated at normal power, then less $ZrO_2$ and $H_2$ are produced. Higher temperatures can be withstood for off-normal and loss-of-coolant scenarios, especially if a glassy Zr—Si—O phase forms. Less hydriding is expected to occur internal to the zircaloy, thereby brittle failure of cladding for wet/dry storage would be mitigated and possibly eliminated. Improved lifetime/strength of the cladding is also feasible.

BRIEF DESCRIPTION OF THE FIGURES

The accompanying figures, in which like reference numerals refer to identical or functionally similar elements throughout the separate views and which are incorporated in and form a part of the specification, further illustrate the embodiments and, together with the detailed description, serve to explain the embodiments disclosed herein.

DETAILED DESCRIPTION

Figure 1:
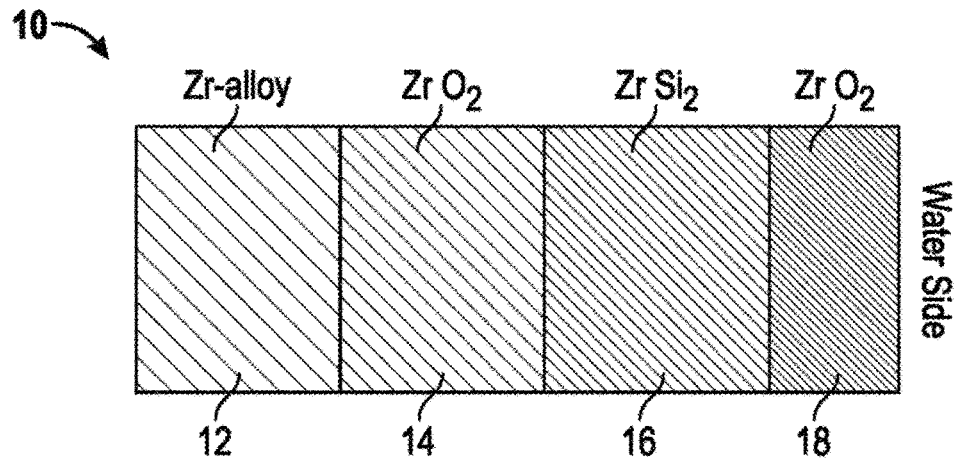
FIG. 1 illustrates schematic diagram of an "as-fabricated" coating in which an outer layer composition (e.g., waterside) depends on the silicide employed and possible pretreatment conditions.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, and/or groups thereof.

In general, two novel modifications to existing LWR fuel and cladding arrangements are disclosed, which improve safety while maintaining or improving fuel performance compared to existing LWR fuels. For the fuel, disks may be placed between fuel pellets, with the disks having much higher thermal conductivity than the $UO_2$, allowing for better heat rejection. In addition, annular pellets may be used instead of solid fuel, with the annulus filled with the higher thermal conductivity material. For fuel performance comparable to existing $UO_2$ at 5% enrichment, the $^{235}U$ enrichment would have to be increased on the order of 7-10%. Cladding modification involves coating the zircaloy with a material such as $Zr_5Si_4$, or other silicides in the Zr—Si system, because they are stable and high melting.

In the event of oxidation, a slag-like amorphous layer is expected to form with mobile, self-healing properties, especially at the elevated temperatures of accident scenarios. In addition, at normal operating conditions, if steam (or water) reaction with zircaloy can be mitigated or eliminated at normal power, then less $ZrO_2$ and $H_2$ are produced. Higher temperatures can be withstood for off-normal and loss-of-coolant scenarios, especially if a glassy Zr—Si—O phase forms. Less hydriding is expected to occur internal to the zircaloy, thereby brittle failure of cladding for wet/dry storage would be mitigated and possibly eliminated. Improved lifetime/strength of the cladding is also feasible. These novel modifications should appeal to industry and the NRC.

In one embodiment, an engineered self-healing zirconium silicide coating for zirconium cladding alloys for Light Water Reactor (LWR) applications can be implemented, which will dramatically improve safety margins during accident scenarios. Such an approach can prevent radiation release to the public with respect to LWR applications. Such an approach reduces the effects of a loss-of-cooling accident.

In general, a $ZrSi_2$ or $ZrSi$ coating can offer excellent prospects to provide a more protective barrier than the native $ZrO_2$ films that form on alloy cladding during routine plant operations, and excellent prospects to provide an exceptional protective barrier during high-temperature accident scenarios. The enhanced protective barrier is derived intentionally by controlling phase and property transformations that occur in the coating during temperature excursions.

Coatings can be fabricated and can be extensively characterized using state-of-the-art instrumentation and testing across a range of length scales from the atomic to the macroscopic in order to assess optimal fabrication. The coated substrates judged satisfactory, near optimal, or optimal are tested under relevant (PWR and BWR) autoclave conditions and again characterized using available advanced characterization tools. Secondarily, an integrated modeling effort can be conducted to develop a quantitative basis, theoretical, semi-empirical, or empirical basis for degradation of these materials. Depending on the progress, tube samples are fabricated and submitted for fretting-wear testing and characterization to evaluate realistic in-service performance behavior.

FIG. 1 illustrates schematic diagram of an "as-fabricated" coating 10 in which an outer layer composition (e.g., water-side) depends on the silicide employed and possible pre-treatment conditions, in accordance with a preferred embodiment. Embodiments thus can be implemented based on preparation of a coating similar to the schematic given in FIG. 1. The coating configuration depicted in FIG. 1 generally includes a $ZrO_2$ layer 18 at the water-side and disposed adjacent a $ZrSi_2$ layer 16, which in turn is disposed adjacent another $ZrO_2$ layer 14. A Zr-alloy layer 12 is located adjacent the $ZrO_2$ layer 14.

The desired performance of the coating 12 is comparable or superior to $ZrO_2$ on zirconium cladding alloys during normal service, and greatly superior to $ZrO_2$ on cladding alloys during accident and loss-of-cooling scenarios. It is believed that zirconium silicide coatings have the potential to degrade during irradiation in a way that enhances the protective nature of the barrier layer through self-healing and transport-limiting processes. Zirconium silicide coatings offer superior performance over $ZrO_2$ on zirconium, and the degradation of $MoSi_2$ (a commercial material that is comparable in some ways) suggests that the performance of zirconium silicides is superior to cladding alloys under high-temperature accident conditions. Zirconium silicides are preferred over $MoSi_2$ because the zirconium is strongly oxophilic so that the zirconium silicide layer is expected to bond more strongly to the inner, native $ZrO_2$ layer than a $MoSi_2$ layer would bond to it.

The disclosed coatings can be implemented to address the goal of maintaining an excellent safety and reliability record in commercial nuclear power plants. If these coatings perform as expected, they may be radiation tolerant as well as accident tolerant, insofar as direct exposure of the cladding to $H_2O$ is mitigated, and less hydriding is beneficial to the cladding under irradiation, which extends cladding lifetime.

Figure 2:
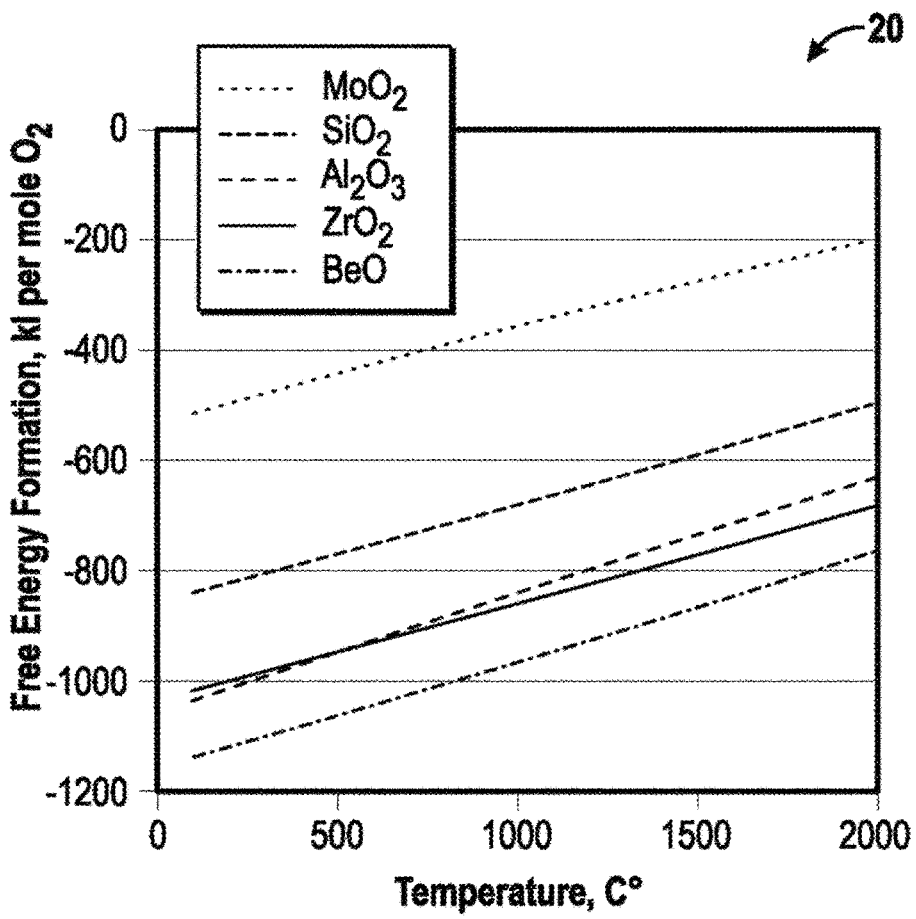
FIG. 2 illustrates a graph indicative of free energy of formation for selected oxides with respect to temperature, in accordance with a preferred embodiment.

FIG. 2 illustrates a graph 20 indicative of free energy of formation for selected oxides with respect to temperature, in accordance with a preferred embodiment. In general, films of $ZrO_2$ on zirconium cladding alloys (hereafter, referred to as cladding) can render alloys kinetically stable for satisfactory commercial application in LWR reactors. The alloys, however, are not thermodynamically stable toward $H_2O$ at coolant temperatures, as indicated by graph 20 of FIG. 2. The "passivated" $ZrO_2$ films that form, whether native or anodized, serve as a protective barrier to slow or prevent further oxidation of the alloy and generation of hydrogen.

Despite the inability of thermodynamics to predict the success of cladding, the thermodynamics of the $Zr$—$ZrO_2$ system indicates the protective layer will fail with increasing temperatures. $ZrO_2$ changes from monoclinic to tetragonal at 1205° C. and the tetragonal phase can transform to the cubic at temperatures as low as 1525° C. In the cladding film, the tetragonal phase can be stabilized adjacent to the alloy, while on the water-side the monoclinic can predominate for thicker films, creating stresses in the oxide. These structural changes in the film induce microcracks that enhance oxide ion transport through the film for further reaction with the cladding. Subsequently, the $ZrO_2$ film can spall off leading to undesirable consequences at very high temperatures. Of course, if $H_2O$ reaches the metal, then oxidation is very rapid.

Intermetallic silicide compounds, such as $MoSi_2$, are stable in air at very high temperatures and for this reason, silicide coatings on cladding offer the potential for improved reliability at normal operating temperatures and at the higher transient temperatures encountered during accidents. At high temperatures, silicides form a mobile silica layer on the surface that impedes further oxidation of the silicide. Cracks and fissures in the silicide coating can develop upon thermal cycling as these arise from differential expansion between the coating and the substrate. However, experience shows that these potential problem areas self-heal upon reheating. As a result, silicides have widespread commercial use in high-temperature applications.

As with $ZrO_2$ films on cladding, silicides have limitations. $MoSi_2$, for example, is unstable at low temperatures (940-1040° C.). The silica layer is not dense enough to prevent oxidation of molybdenum and the volume expansion resulting from $MoO_3$ formation fractures the film and fails the part. At intermediate temperatures, film ductility improves and fracture does not occur. Above 1540° C., a dense silica film forms that substantively halts the formation of $MoO_3$. $MoSi_2$ is therefore preheated to very high temperatures in order to gain some stability for its use at low and intermediate temperatures.

In other applications, additives have been used to promote formation of the dense glassy silica layer. Fused slurry silicide coatings were prepared for protection of tantalum alloys. Their cyclic oxidation tests showed that a slurry composition of 25Zr-30Mn-45Si provided coating lifetimes exceeding 100 thermal cycles for tests to 1427° C. and 10 Torr (air). This system and a range of others were investigated in an effort to tune the mobility of the dense glassy silica layer (cf. glass transition temperature).

Zirconium silicides have received some recent interest in nuclear applications. The superior corrosion resistance of $ZrSi/Zr_2Si/Zr$, compared to zirconium metal, was reported by Caillet, et al. This result is somewhat surprising from arguments in the literature because the greater stability of $ZrO_2$ favors its formation compared to $SiO_2$ (FIG. 2); consequently, the protective silica barrier layer is not expected to form. In one embodiment, a silicide coating system remedies the above limitations by producing a coating with a performance comparable or better than native or anodized $ZrO_2$ on cladding and superior performance at elevated temperatures of accident scenarios. This improvement is based on the high-temperature performance of $MoSi_2$.

The as-fabricated coating 10 of FIG. 1, for example, generally involves the zirconium alloy substrate or layer, an inner $ZrO_2$ layer, the silicide layer, and an outermost layer of $SiO_2/ZrO_2$ (or zircon, $ZrSiO_4$), which can be exposed to the reactor coolant. The inner layer of $ZrO_2$ can be present either as the native film or as an anodized layer. The existence of the $ZrO_2$ inner layer will improve the performance of the coating that follows from the anticipated self-limiting degradation that develops through thermal excursions, either prior to or after reactor insertion as shown in, for example, the configuration depicted in FIG. 3.

Figure 3:
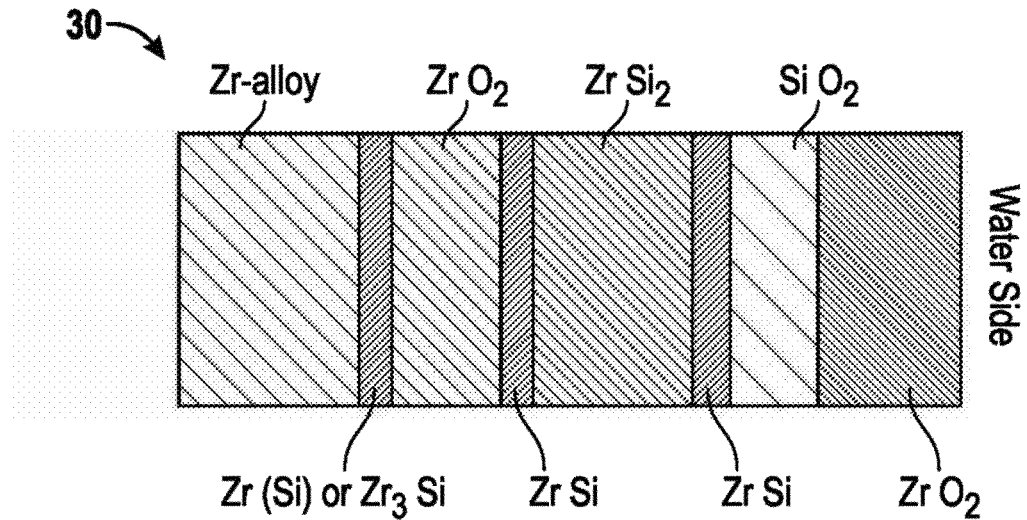
FIG. 3 illustrates a schematic diagram of coating configuration 30 with desired film degradation behavior, in accordance with an alternative embodiment.

FIG. 3 illustrates a schematic diagram of coating configuration 30 with desired film degradation behavior, in accordance with an alternative embodiment. The configuration 30 of FIG. 30 indicates that initial choices for the silicide layer material include $ZrSi_2$ and $ZrSi$. Even though $ZrSi_2$ melts at 1620° C., this temperature is only 230° C. below the melting point of zirconium metal. Based on thermodynamic arguments, $ZrSi_2$ should give better performance than $ZrSi$. The lower zirconium activity in the $ZrSi_2$ is expected to compensate in some measure for the greater stability of $ZrO_2$ compared to $SiO_2$, allowing the formation of the $SiO_2$ barrier layer under the water-side $ZrO_2$ layer. In another embodiment, the monosilicide, $ZrSi$, is not expected to readily produce an effective silica barrier layer, producing instead the thermodynamically favored $ZrO_2$ outer layer, lacking the mobility and barrier properties of the silica layer. However, the higher melting point of $ZrSi$, its greater thermodynamic stability, and its superior performance in limited testing indicates the reasons that $ZrSi$ will perform comparably to $ZrSi_2$ and both silicides are effective on account of the degradation phenomena described below by example.

At high temperatures during operation, and possibly during a pretreatment, an outer layer of $ZrO_2$ (and possibly zircon, $ZrSiO_4$) will form outermost on the coating (water-side). As this layer forms, the zirconium activity in the silicide layer can be reduced, favoring oxidation of silicon to $SiO_2$. This inner layer of silica now provides the barrier layer to oxygen and moisture transport, and glassy properties for properties at elevated temperatures will accommodate the structural transformation of the outer $ZrO_2$ from the monoclinic to tetragonal phase under accident scenarios.

Figure 4:
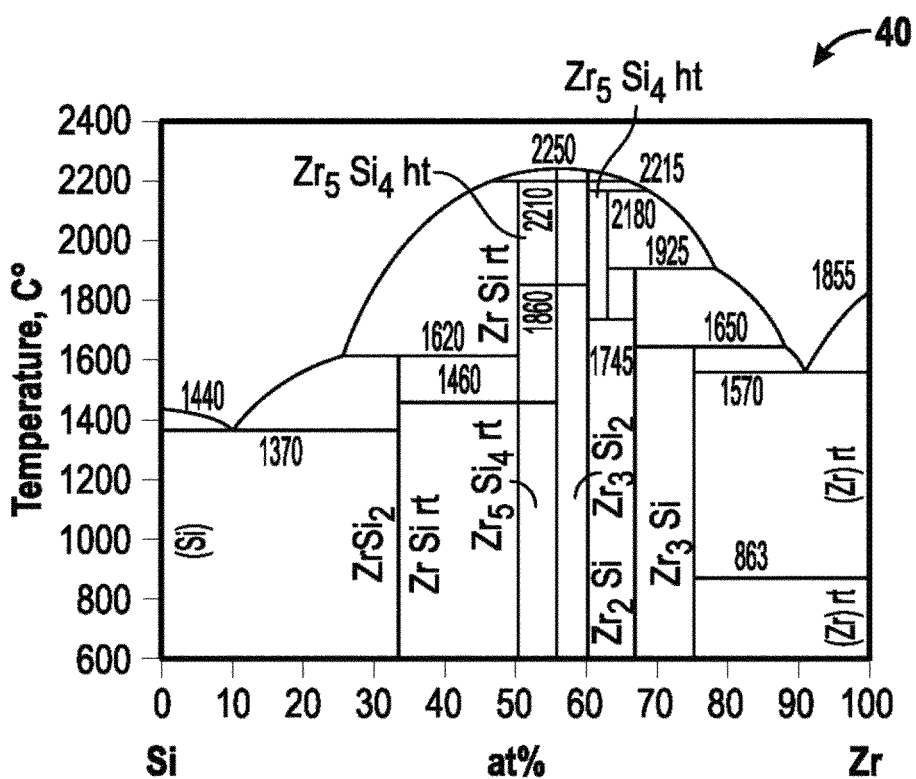
FIG. 4 illustrates a binary Si—Zr phase diagram indicating that as silicon is depleted from $ZrSi_2$, the silicide is enriched and driven toward high melting silicide phases, in accordance with an alternative embodiment.

As silicon is depleted in the silicide layer adjacent to the water-side $ZrO_2$, the silicide composition can be driven toward the higher melting zirconium silicide phases (FIG. 4). For example, $ZrSi_2$ depleted of silicon is driven toward $ZrSi$; likewise, $ZrSi$ depleted of silicon is driven toward $Zr_5Si_4$. Both of these silicides are more stable and have higher melting temperatures than their precursors, indicating how the protective nature of the barrier layer is enhanced. Another possibility, however, is that the silicon (in the silicide) oxidized to $SiO_2$ is just the balance of silicon remaining from oxidation of zirconium in the silicide to $ZrO_2$ or $ZrSiO_4$.

In the silicide layer adjacent to the inner, cladding-side $ZrO_2$, the film is initially chemically stable, but not thermomechanically stable due to mismatch in thermal expansion. Likewise the $ZrO_2/Zr$ interface is chemically stable, but not thermomechanically stable. As a consequence of normal thermal cycling for reactor maintenance, these interfaces develop cracks and fissures. Under ordinary conditions, in the absence of a silicide coating, further oxidation of the zirconium cladding would result. However, for these two interfaces (shown in FIG. 3) self-healing will occur driven by an inferred higher mobility of silicon in the $ZrO_2$ as compared to oxygen in the silicide. These mobility differences occur because of the greater stability of $ZrO_2$ compared to $SiO_2$ along with significant differences in the melting points. The resulting silicon migration toward the cladding will result in its reaction and uptake into the cladding. As silicon is removed from the silicide coating near the inner layer, the original zirconium silicide composition is driven toward the higher zirconium compounds with higher melting points and greater thermodynamic stability as indicated by FIG. 4.

FIG. 4 illustrates a binary Si—Zr phase diagram 40 indicating that as silicon is depleted from $ZrSi_2$, the silicide is enriched and driven toward high melting silicide phases, in accordance with an alternative embodiment. FIG. 4 demonstrates that the uptake of some silicon into the cladding is perceived to be a benefit for these coatings. As an impurity, silicon may be expected to promote plasticity and further enable the self-healing for thermal cycling. In excess of its low solubility in zirconium, the silicon in cladding can form $Zr_3Si$ and may induce creep from the associated stresses.

On the other hand, dispersions of small precipitates of $Zr_3Si$ can stabilize the morphology and slow down creep, and the radiation-induced displacement processes may support such dispersions. Routine thermal cycling for reactor maintenance, then, may induce their aggregation and crystallization, which is ordinarily a negative effect. As can be seen from this discussion regarding the behavior of the cladding, the native cladding itself can be altered and in-pile testing is therefore required to assess the extent of the processes described herein.

Based on the above arguments, the degradation of the silicide coating is expected to be self-limiting as with conventional $ZrO_2$, except the silicide is expected to be more stable with temperature and time. Furthermore, its resulting properties are expected to be self-healing with regard to thermal cycling. Lastly, the high-temperature barrier to rapid oxidation and hydrogen evolution can be enhanced.

Coatings can be applied following one or more methods described in the literature. They can be applied to zirconium metal, Zircaloy-2, Zircaloy-4, and/or M5 alloy substrates (coupons or tubes). The substrates can be pretreated chemically or electrochemically to lessen or enhance the native $ZrO_2$ film.

Table I summarizes the overall flow of the process, the number of variables, and the number of levels for each variable for determining improved, near-optimal, and optimal performance. Some trials are conducted with zirconium metal only as substrate. Expanded trials include zirconium alloys for substrate pretreatment (or none), and then coating trials will begin with one coating method and with one coating material on the alloys. In another embodiment, other coatings may be attempted, for example, with small amounts of dopants to stabilize further the coating and thereby improve performance.

TABLE I

Summary of Variables and Their Levels Considered for Testing.

| Variable or Process Step | Number of Levels that captures range of behavior |
| --- | --- |
| Substrates | Up to four (Zr and 3 alloys) |
| Pre-treatment | Two to three levels |
| Coating Method | One or two methods |
| Coating Material | Two to three (ZrSi2, ZrSi, ZrSiM) |
| Post-treatment | One to two (Heat treat with steam or not) |

In two different embodiments, coating methods are fused-slurry and silane ($SiH_4$) decomposition on heated substrates. In the fused slurry method, slurry of powdered precursors can be airbrushed onto the substrates. The precursors are zirconium and silicon powders that were milled together in appropriate proportions. After application, the coated substrate can be vacuum-heated to 1400-1500° C. to melt or react the powders. Silane decomposition, the second method, is simple and direct, but requires care in handling. In this case, $SiH_4$ reacts with hot substrates to produce silicides and by-product hydrogen.

Short thermal exposures can be attempted to develop the coatings to help avoid altering the substrate microstructure as much as possible. The primary interest is to establish the performance of the coatings. In alternative embodiments, microstructure retention or recovery and performance are improved using lower temperature fabrication routes, forced-cooling fabrication routes, or additional stress/heat treatments.

Coating micro-structural, mechanical, and thermal stability can be characterized using a variety of advanced techniques. Mechanical integrity can be evaluated with scratch tests on a nano indentation system. In-situ thermal cycling tests can be performed in a scanning electron microscope with a heating stage to evaluate thermal stability. The microstructure and microchemistry of the coatings can be evaluated using high-resolution SEM, FEG-STEM, and, as appropriate, atom probe tomography (APT). Cross-section samples prepared from a focused-ion beam (FIB) can permit detailed analysis of the coating-cladding bonding and inter diffusion behavior as a function of thermal cycling. These analytical tools can also be used to (1) identify the detailed phase and chemistry distributions that develop in the coatings as a result of the fabrication processes, (2) guide development of optimized processing methods, and (3) provide the fundamental data for quantitative model development.

All of the analytical tools mentioned above are useful to characterize the coating post-autoclave testing. The effect of the thermal transients during testing on the protective nature of the coating can be evaluated in terms of changes in coating structure. In particular, evidence of impeded or enhanced oxidation of the substrate can be sought after.

One of the key goals of the disclosed embodiments is to configure Zr-alloy claddings that are more oxidation resistant, and which, in turn, will make them more accident tolerant in high-temperature accident scenarios. To establish the efficacy of silicide surface modification treatments to provide protection against corrosion, test coupons of surface-treated and control Zr-alloy can be exposed to high-temperature, high-pressure water autoclave. Routine thermal cycling as well as high-temperature conditions can be then examined. The utilized autoclave can operate at any combination of temperatures and pressures up to 650° C. and 25 MPa, respectively.

Tests can be performed in typical LWR operating conditions (e.g., 320° C. and 16 MPa) as well as in more aggressive conditions at temperatures and pressures to simulate an off-normal scenario for LWR operation. Samples can be evaluated using weight change measurements, x-ray diffraction, Auger electron spectroscopy, and scanning electron microscopy-energy dispersive spectroscopy (SEM-EDS) analysis. In particular, the focused ion beam (FIB) capabilities can be employed to section a sample using Ga-ion for evaluating, at a fundamental level, the near-surface structure, oxide growth, and the various interfaces that may develop during the high-temperature treatments. All characterization work can be performed on the samples before and after high-temperature autoclave tests.

In a reactor or during a heat treatment, the $ZrSi_2$ or $ZrSi$ coating layers are very likely to be oxidized and eventually form $ZrO_2$, $SiO_2$, or $ZrSiO_4$ oxide products. These oxides can serve as barrier layers for further corrosion of Zr alloys. Similar to the corrosion of pure Zr alloys, it is expected that the cathodic half-cell reaction at the oxide/$H_2O$ interface produces oxygen ions and the anodic half-cell reaction at the oxide/metal interface produces electrons. The rate-limiting step could be either the inward oxygen transport or the outward electron transport. The band gap is about 8.9 eV for $SiO_2$, 5.5 eV for $ZrSiO_4$, and 5.4 eV for $ZrO_2$.

Therefore, from the aspect of electron transport, the oxide products of zirconium silicides have similar or improved oxidation resistance as pure $ZrO_2$. However, it is unknown whether the oxygen atom transport in these oxides is also slower than in $ZrO_2$. In addition, it is generally believed that grain boundaries in the oxide layers are fast oxygen transport paths, but some studies indicate this conventional wisdom may not be always true. Moreover, the oxide layers are under high stresses due to the lattice mismatch between different interfaces. How the corrosion-induced stresses modify the oxygen transport is not fully understood.

In another embodiment, an innovative oxide fuel design can be implemented, which lowers the peak operating temperature and allows power up-rates. An annular fuel is used to house inserts to improve thermal conductivity and discs are used between the pellets to gain further improvements. Simulations were performed with the BISON fuel performance code and showed that peak operating temperatures were lowered from 1375 C to 733 C for the case of Nb metal inserts and discs at a linear power of 426 W/cm. A brief study was done for different sizes of the annulus and discs along with the enrichment needed to compensate for the displaced $UO_2$. A U-235 enrichment as low as 7.5% could be used to maintain the average reactivity of conventional solid pellets at 5% enrichment. Enrichments as high as 8-10% could be then employed for power plant up-rates that offset the added fabrication costs while still giving an enhanced safety margin under normal operation and accident scenarios.

Figure 5:
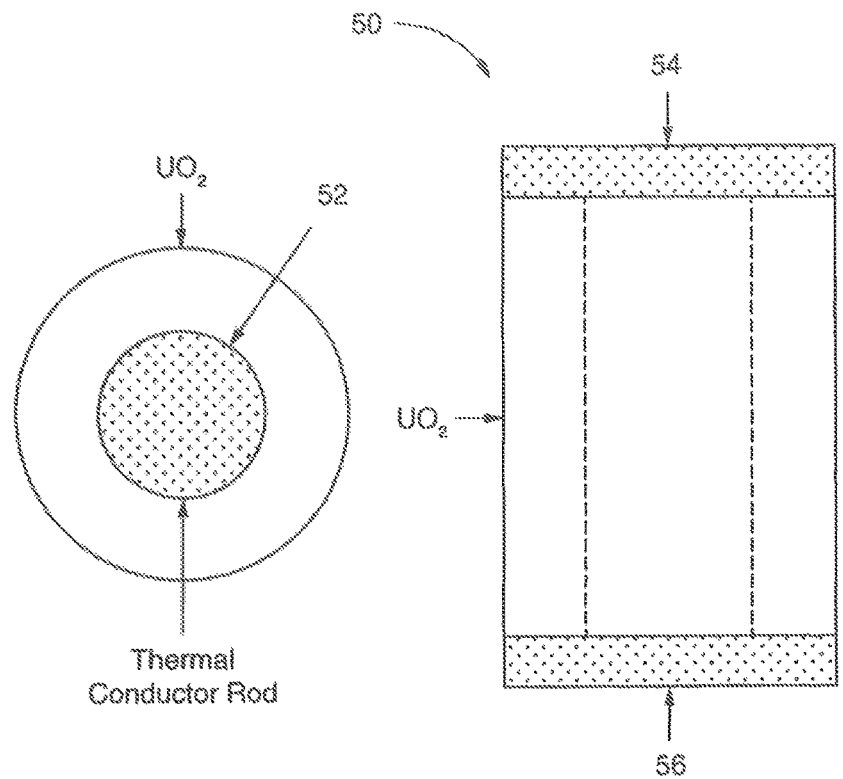
FIG. 5 illustrates a schematic diagram of an annular fuel arrangement including a solid insert for filling a central annulus of a $UO_2$ fuel pellet for which the insert has a substantially higher thermal conductivity than the $UO_2$ fuel, in accordance with an alternative embodiment.
Figure 5:
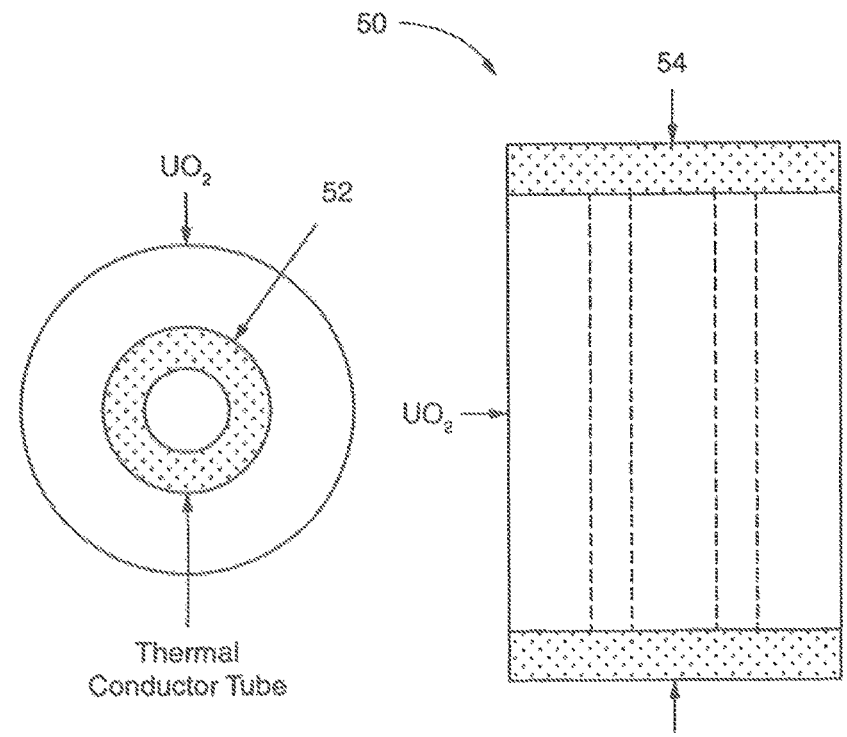

FIG. 5 illustrates a schematic diagram of an annular fuel arrangement 50 including a solid insert for filling a central annulus of a $UO_2$ fuel pellet, for which the insert has a substantially higher thermal conductivity than the $UO_2$ fuel, in accordance with an alternative embodiment. In the annular fuel arrangement 50 shown in FIG. 5, a solid insert 52 can be employed to fill a central annulus of a $UO_2$ fuel pellet, for which the insert 52 has a substantially higher thermal conductivity than the $UO_2$ fuel. The insert 52 thus functions as a thermal conductor. Note that portions 54 and 56 shown in FIG. 5 are also thermal conductors. Each pellet is also capped, or separated, by discs in contact with the solid insert. The disc material can be the same as, or different, from the annular insert and also has higher thermal conductivity than the $UO_2$ fuel.

The increased enrichments needed to compensate for the displaced volume of $UO_2$ can be readily assessed. In a parametric evaluation for enrichment increases on the order of 7% U-235, the volume fraction of an inert thermal conductor can be as low as 0.28. While this value for the enrichment is too low for typical dispersion fuels, it is thus found to be acceptable for the present annular fuel design.

Figure 6:
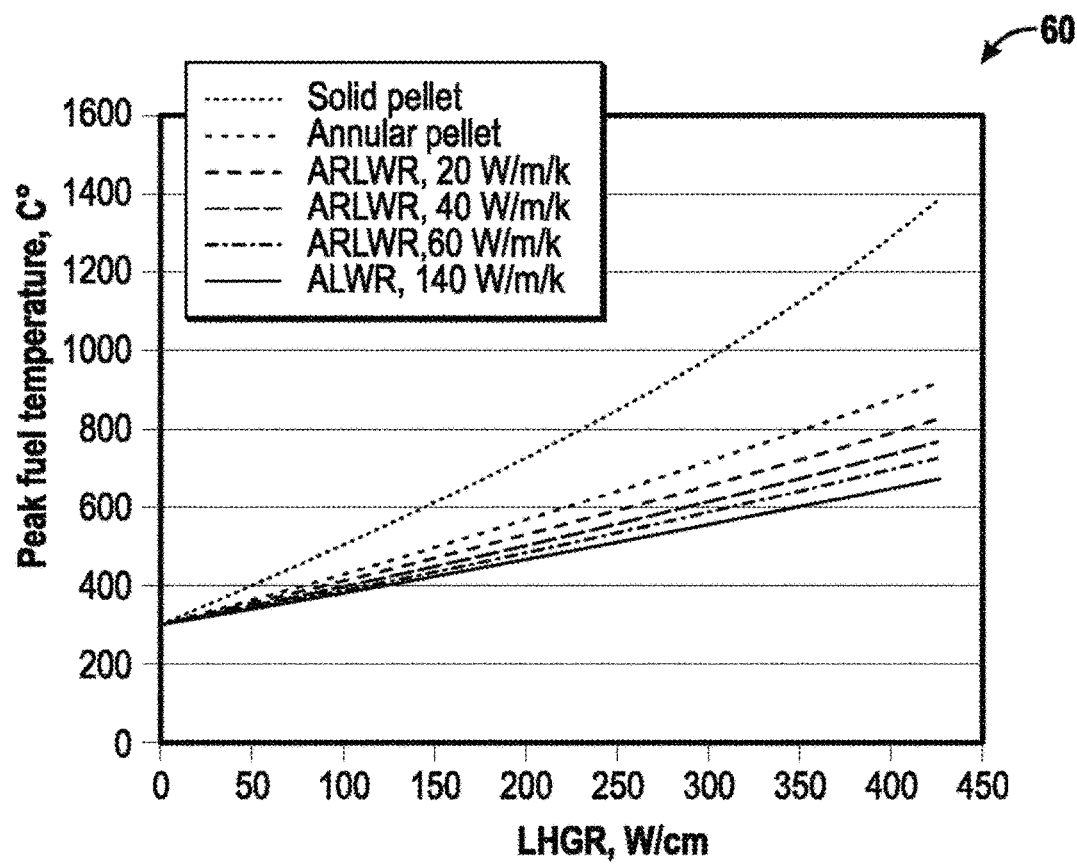
FIG. 6 illustrates a graph including data indicative of temperature profiles in relation to Linear Heat Generation Rate (LHGR) with a gap size of 3.0 microns, He-filled, employed throughout and temperature-independent helium conductivity of 0.3 W/m-K, in accordance with an alternative embodiment.

FIG. 6 illustrates a graph 60 including data indicative of temperature profiles in relation to Linear Heat Generation Rate (LHGR) with a gap size of 3.0 microns, He-filled, employed throughout and temperature-independent helium conductivity of 0.3 W/m-K, in accordance with an alternative embodiment. The thermal response of this design can be evaluated using the BISON fuel performance code. Graph 60 shown in FIG. 6 summarizes results for a peak power of 426 W/cm.

In the example shown in FIG. 6, the peak temperatures in relation to linear power are indicated for a thermal conductivity of 20 W/m-K. Overall, a major reduction in peak fuel temperature can be obtained for the innovative concept. For fresh fuel (e.g., 82 µm as-fabricated gap), the peak fuel temperature can be reduced by 1000° C. For irradiated fuel where the gap has closed significantly, the peak temperature can be reduced by approximately 575° C. when employing a material with a thermal conductivity of 20 W/m-K. The benefit is attributed primarily to the annular form of the $UO_2$ fuel and the large number of high conductivity discs in contact with the hot central regions that serve as heat fins. These calculations are confirmed by results for the analogous system with solid $UO_2$ (no annulus, no discs) that agree with known temperature characteristics for oxide fuels in LWRs. The temperature contours are shown in FIG. 7.

Figure 7:
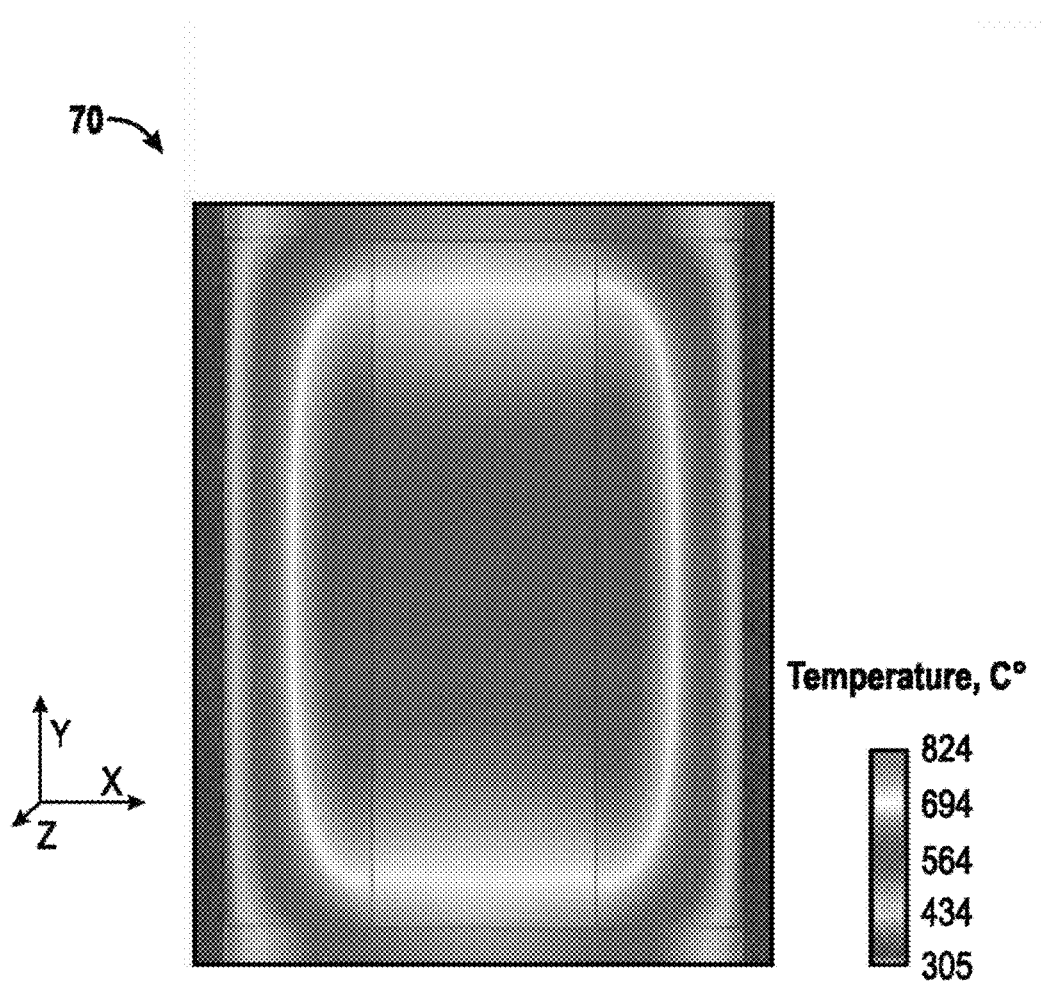
FIG. 7 illustrates a temperature contour for ARLWR concept with discs and inserts having thermal conductivity of 20 W/m/K, in accordance with an alternative embodiment.

FIG. 7 illustrates a temperature contour 70 for ARLWR concept with discs and inserts having thermal conductivity of 20 W/m/K, in accordance with an alternative embodiment. The modeling also evaluated a smaller insert diameter with increased disk height, while keeping the volume of $UO_2$ constant, and found only a slight increase in peak temperature (on the order of 10 Celsius degrees). While the need for some optimization can be recognized, these results demonstrate the superior effectiveness of this new design.

Since annular fuel even without the addition of the thermal conductors exhibits some benefits, a lower peak temperature than solid $UO_2$ operation for the same linear power, a significant benefit may be possible even by using discs only at the top and bottom of pellets, leaving the annulus hollow. For this case, using disks only (0.12 cm height, 20 W/m-K) the peak temperature is 876 C at 426 W/cm. This arrangement is simple to fabricate, with little departure from current processes. A greater thermal benefit would be obtained for molybdenum because of its high thermal conductivity and its neutronics penalty would be mitigated. This alternative embodiment presents a lower cost approach that still achieves substantial benefit in performance and safety. Furthermore, any fracturing and collapse of individual pellets will be kept local to each pellet position because the disc will keep fuel material from falling into the annular regions of pellets lower in the fuel column.

Several candidate materials have been identified to satisfy performance requirements that include thermal conductivity, chemical inertness, melting point, neutron absorption cross-section, and compatibility with conventional recycle processes. Cost is a factor for both materials and manufacturing, so it is desirable to identify materials with an existing technological infrastructure. Additionally, a cubic lattice is desirable for isotropic expansion. A material that will be resistant to irradiation-induced effects such as void swelling or phase transformations is also desired. The ongoing evaluation of materials has preliminarily identified Si, Zr, Nb, Mo, some alloys, and possibly zirconium silicides as good candidates based on available information. Silicon is a very favorable candidate in many respects, except its melting point (1414° C.) is marginally too low. The lower fuel operating temperatures, however, accommodate its use for normal operations and the upper fuel temperature for extreme accident scenarios would need further evaluation.

Zirconium is also a very favorable candidate, except the lattice transforms from hexagonal to bcc at approximately 866° C. Zirconium, however, could be alloyed, for example, with niobium to stabilize the bcc phase. At the eutectoid composition of approximately 81Zr-19Nb (weight percent), the bcc onset temperature is 620° C. with a solidus at approximately 1740° C., which is not much less than the melting point of pure zirconium (1855° C.). Such an alloy would avoid the neutronics penalty that would result from using pure niobium and the thermal conductivity of the alloy is expected to be only slightly depressed as a consequence of alloy formation.

Niobium is perhaps the best candidate in respect of its high thermal conductivity and high melting point. Its cost may be a problem and there is a mild neutronics penalty associated with its use. More exotic materials that may meet most or all of the performance requirements and with a high melting point are also possible, despite their lack of a large technology infrastructure.

Major benefits in fuel thermal performance can be obtained with a modest increase in the U-235 enrichment of oxide fuel, if some of the existing pellet volume is replaced by an annular core and discs with higher thermal conductivity. At approximately 7.5% enrichment, the volume fraction of $UO_2$ needs to be approximately 0.70 in order to maintain the reactivity of solid $UO_2$ pellets at 5% enrichment. The benefits extend further than merely reducing fuel temperature and increasing response time in an accident scenario.

Fission gas pressure within fuel pores would also be reduced significantly during normal operation; consequently, less fission gas release would be expected for a fuel operating at these lower temperatures; this benefit alone offers the potential to enable higher burnup. The wet and dry storage temperatures of the fuel would be lowered, which may offer added benefits upon further evaluation. More importantly, the likelihood of being able to restart with the same core for more severe off-normal events is increased; and the likelihood of simple core removal, and possibly even the reuse of the pressure vessel, is increased for the loss-of-cooling accident case. A drawback of other annular fuel designs is the possibility of large changes in fuel geometry when individual pellets fracture and collapse. Debris from one pellet can fall into annular regions of pellets lower in the fuel column. Therefore, a major benefit is found for rod-like or tube-like inserts in the annulus and for discs separating one annular pellet from another annular pellet.

A further increase in U-235 enrichment, up to approximately 10%, renders the fuel design attractive to commercial vendors for the increased burnup and up-rates possible. Even though up-rates correspond to increased power and peak temperatures, the safety margin is still greatly increased, both for normal operation and for accident scenarios. This supplemental increase in enrichment makes the fuel economically attractive and more readily adopted.

Modeling studies can address detailed accident simulations of full-length pins for comparison to the transient behavior of conventional oxide fuels. For example, the full-length pin simulations can examine the thermal characteristics for using the new design only in a portion of the fuel pin such as the middle third that experience the highest fuel temperatures. CALPHAD-type software is available that may help examine the influence of O/M ratios on the possible formation of ternary oxides, because their presence may help ensure a gap does not form at the annular cores. Neutronics studies can address the needed enrichment in more detail, depending on the dimensions of the conducting cores/discs and on the material under consideration. Some low Cr—Fe alloys could be evaluated as thermal conductors because of their low cost, at least for the purpose of assessing the increased enrichment needed. It seems reasonable to expect, however, that the higher cost of zirconium annular cores is favored over steel cores, just as zirconium cladding is favored over steel cladding, for reasons of neutron economy.

Experimental studies allow down-selection of improved, near-optimal, and optimal materials, sizes, and tolerances because: 1) simulations show that major benefits are possible, 2) candidate materials are known to be compatible, and 3) rodlets for initial testing can be fabricated. Initial materials tests involve annular inserts and discs include zirconium, Zr-19Nb alloy, niobium, and silicon. Materials tests also involve discs with hollow annular fuel using molybdenum and niobium as the disc material. Furthermore, irradiation tests are conducted to assess the performance of the new design relative to swelling behavior, fission gas release, compatibility of fuel and inert components under conditions of high temperature and irradiation, and the ability to maintain good conduction paths under thermal and mechanical stresses. In parallel with irradiation testing, fabrication methods are involved and evaluated for improved, near-optimal, and optimal alternatives with regard to fuel performance, safety and economics.

A promising candidate for the inert thermal conductors appears to be niobium. The peak fuel temperature can be lowered by approximately 640 degrees Celsius compared to a solid oxide fuel pellet at a peak power of 426 W/cm, and it is lowered by approximately 180 degrees Celsius compared to annular fuel (i.e., hollow). Even though the benefit achieved by use of a niobium-filled annulus over that of a hollow annulus is not dramatic, the safety benefit that results from eliminating the possibility of oxide fuel shards axially relocating by means of the annulus indicate the significant benefit from its use in controlling reactivity along the fuel column length by controlling the density of U-235 along the fuel column. Finally, the melting point for pure niobium is comparable to the oxide fuel. The drawbacks are the increased parasitic absorption cross-section in niobium and its cost. Using this fuel design only in the hottest portion of the fuel column could reduce the effect of the increased cross-section, and the increased cost can be offset by sufficient enrichment increases to allow power up-rates.

The disclosed innovative oxide fuel concept can thus offer a substantial reduction in peak fuel temperature over conventional oxide fuel. The concept incorporates a central annulus filled with a good thermal conductor and fuel pellets that are capped top and bottom with a similarly good thermal conductor. The U-235 enrichment must be increased to approximately 7.5% to maintain the reactivity of solid $UO_2$ pellets at 5% enrichment. Results from preliminary modeling indicate that the peak fuel temperature drops from 1375 to 733° C. at a peak power of 426 W/cm when niobium is used as the thermal conductor. Evaluation of candidate materials indicates that niobium, zirconium, 81Zr-19Nb alloys, or molybdenum are excellent candidates for irradiation testing. Neutronics calculations are needed to better assess enrichment requirements, for example, to compare pure niobium with 81Zr-19Nb.

While this concept is similar to annular fuel concepts of the past, it brings significant performance benefits in both normal and accident operations over previous concepts owing to lower fuel temperatures which reduce stored energy, fission gas release, and fuel pin plenum pressure, thereby increase the margin to fuel melting or cladding rupture. Furthermore, these benefits for this novel design can be achieved readily with existing materials and technology infrastructures, which should serve to mitigate the increased cost of fuel fabrication. Some financial incentive to offset, to fully compensate, or to yield a return on investment for increased manufacturing costs (e.g., in the form of up-rates and increased burnup) is possible if enrichment is increased, for example, to approximately 10% while still maintaining an increased safety margin.

Note that some embodiments can incorporate an uprate that corresponds to an increased average and maximum LHGR (linear heat generation rate). Without describing a theory of reactor operation, lower peak fuel temperatures derived from increased thermal conductivity for the annular fuel design permit uprates from a given reactor, with some corresponding increase in peak temperatures up to the safe operating temperature limit found for the absence of the annular fuel design. The uprate, or increased power, however is subject to limits on inlet and outlet temperature of the coolant, on coolant flow rate, on initial reactivity of a fuel assembly, and on other factors such as maintaining good thermal contact between cladding and coolant as coolant flow increases, precluding liftoff of assemblies from their rest position with increased coolant flow, etc.

Such uprates provide an economic benefit in the form of higher return on the investment—more electricity. The increased density of the U-235 with enrichments up to, for example, 10% U-235 can alternatively provide for modified loading schemes of fuel assemblies at existing power factors with a smaller number of assemblies to achieve some economic benefit (for example, lower fuel cost for a given power factor). In some embodiments the peak fuel temperature at 200 watts per centimeter (LHGR) can be lowered from approximately 720 C to approximately 530 C, or preferably to approximately 500 C, or more preferably to approximately 460 C.

In another embodiment, the peak fuel temperature at 420 watts per centimeter (LHGR) can be lowered from approximately 1360 C to 820 C, or preferably to approximately 720 C, or more preferably to approximately 670 C. In some embodiments the peak fuel temperature is lowered by more than 500 C for at least a portion of the lifetime of the fuel assembly.

Modeling efforts can address full-length pins with more detailed fuel performance modeling using, for example, BISON, especially accident scenarios, and to address materials interactions using, for example, CALPHAD-type software.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A system for accident tolerant oxide fuel, said system comprising:
   a fuel assembly comprising at least one disk placed axially between fuel pellets composed of $UO_2$, wherein said at least one disk possesses a higher thermal conductivity material than that of said $UO_2$ to provide enhanced heat rejection thereof; and
   wherein said fuel pellets comprise annular pellets having an annulus filled with a higher thermal conductivity material from that of said at least one disk,
   wherein each annulus among said annular pellets is filled with rod-shaped inserts.

2. The system of claim 1 wherein at least one of said higher thermal conductivity material comprises at least one of the following: Si, Zr, $Al_2O$, Nb or Mo.

3. A system for accident tolerant oxide fuel, said system comprising:
   at least one disk placed axially between fuel pellets comprising $UO_2$, wherein said at least one disk possesses a higher thermal conductivity material than that of said $UO_2$ to provide enhanced heat rejection thereof;
   wherein said fuel pellets comprise annular pellets having an annulus filled with a higher thermal conductivity material from that of said at least one disk; and
   a cladding coating comprising zircaloy coated with a material that provides stability and high melting capability and self-healing properties at elevated temperatures,
   wherein each annulus among said annular pellets is filled with rod-shaped inserts.

4. The system of claim 3 wherein said material coated on said zircaloy comprises $ZrSi_2$.

5. The system of claim 3 wherein said material coated on said zircaloy comprises at least one silicide.

6. The system of claim 3 wherein said material that provides stability and high melting capability and self-healing properties at elevated temperatures is ZrSi, and wherein said higher thermal conductivity material comprises at least one of the following: Si, Zr, $Al_2O_3$, Nb, or Mo.

* * * * *